(12) United States Patent
Zeiynali Farid et al.

(10) Patent No.: US 12,518,620 B2
(45) Date of Patent: Jan. 6, 2026

(54) DETECTING LANE-LEVEL TRAFFIC USING CONNECTED VEHICLE DATA WITHOUT LANE IDENTIFICATION INFORMATION

(71) Applicant: Toyota Motor Engineering & Manufacturing North America, Inc., Plano, TX (US)

(72) Inventors: Yashar Zeiynali Farid, San Jose, CA (US); Emrah Akin Sisbot, Menlo Park, CA (US); Divya Sai Toopran, San Jose, CA (US); Kentaro Oguchi, Sunnyvale, CA (US)

(73) Assignees: Toyota Motor Engineering & Manufacturing N.A, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 106 days.

(21) Appl. No.: 18/627,875

(22) Filed: Apr. 5, 2024

(65) Prior Publication Data
US 2025/0316162 A1 Oct. 9, 2025

(51) Int. Cl.
*G08G 1/01* (2006.01)
*G06F 18/23* (2023.01)
*G08G 1/052* (2006.01)
*G08G 1/0967* (2006.01)

(52) U.S. Cl.
CPC ........... *G08G 1/0133* (2013.01); *G06F 18/23* (2023.01); *G08G 1/0112* (2013.01); *G08G 1/0141* (2013.01); *G08G 1/052* (2013.01); *G08G 1/096725* (2013.01)

(58) Field of Classification Search
CPC .. G08G 1/0133; G08G 1/0112; G08G 1/0141; G08G 1/052; G08G 1/096725; G06F 18/23
See application file for complete search history.

(56) References Cited

U.S. PATENT DOCUMENTS

| 10,733,881 B2 | 8/2020 | Xu et al. |
| 10,991,242 B2 | 4/2021 | Taylor |
| 11,301,769 B2 | 4/2022 | Wu et al. |
| 11,460,312 B2 | 10/2022 | Fowe |
| 2022/0383736 A1* | 12/2022 | Daube ................. G08G 1/0116 |
| 2023/0134612 A1 | 5/2023 | Zeiynali Farid |
| 2023/0136374 A1 | 5/2023 | Zeiynali Farid et al. |

FOREIGN PATENT DOCUMENTS

| CN | 109121097 A | 1/2019 |
| CN | 110949398 B | 9/2021 |

* cited by examiner

*Primary Examiner* — Yuen Wong
(74) *Attorney, Agent, or Firm* — DINSMORE & SHOHL LLP (57) ABSTRACT

A method may include receiving driving data from a plurality of vehicles within a sampling region. The driving data may include speeds, positions, and lane change activity of the plurality of vehicles. The method may further include determining speeds of the plurality of vehicles based on the driving data. The method may further include performing cluster analysis on the speeds of the plurality of vehicles. The method may further include determining whether the speeds of the plurality of vehicles comprise more than one cluster based on the cluster analysis. Upon determination that the speeds of the plurality of vehicles comprise more than one cluster, the method may include determining that lane-level traffic is present within the sampling region.

20 Claims, 6 Drawing Sheets

DETECTING LANE-LEVEL TRAFFIC USING CONNECTED VEHICLE DATA WITHOUT LANE IDENTIFICATION INFORMATION

TECHNICAL FIELD

The present specification relates to traffic monitoring, and more particularly, to detecting lane-level traffic using connected vehicle data without lane identification information.

BACKGROUND

Lane-level traffic, in which average speeds of vehicles in different lanes of a road significantly vary, can lead to traffic congestion, and may increase traffic accidents. As such, it may be desirable to detect lane-level traffic such that drivers and/or autonomous vehicles can navigate accordingly. However, GPS data from vehicles may not be accurate enough to determine which lane a vehicle is driving in, and lane-level data from vehicles may not be readily available. As such, a need exists for methods of detecting lane-level traffic using connected vehicle data without lane identification information.

SUMMARY

In an embodiment, a method may include receiving driving data from a plurality of vehicles within a sampling region. The driving data may include speeds, positions, and lane change activity of the plurality of vehicles. The method may further include determining speeds of the plurality of vehicles based on the driving data. The method may further include performing cluster analysis on the speeds of the plurality of vehicles. The method may further include determining whether the speeds of the plurality of vehicles comprise more than one cluster based on the cluster analysis. Upon determination that the speeds of the plurality of vehicles comprise more than one cluster, the method may include determining that lane-level traffic is present within the sampling region.

In another embodiment, a computing device may include one or more processors. The processors may receive driving data from a plurality of vehicles within a sampling region. The driving data may include speeds, positions, and lane change activity of the plurality of vehicles. The processors may determine speeds of the plurality of vehicles based on the driving data. The processors may perform cluster analysis on the speeds of the plurality of vehicles. The processors may determine whether the speeds of the plurality of vehicles comprise more than one cluster based on the cluster analysis. Upon determination that the speeds of the plurality of vehicles comprise more than one cluster, the processors may determine that lane-level traffic is present within the sampling region.

In another embodiment, a system may include a computing device and a plurality of vehicles. The plurality of vehicles may transmit driving data to the computing device. The driving data may include speeds, positions, and lane change activity of the plurality of vehicles. The computing device may include one or more processors. The processors may determine speeds of the plurality of vehicles based on the driving data. The processors may perform cluster analysis on the speeds of the plurality of vehicles. The processors may determine whether the speeds of the plurality of vehicles comprise more than one cluster based on the cluster analysis. Upon determination that the speeds of the plurality of vehicles comprise more than one cluster, the processors may determine that lane-level traffic is present within the sampling region.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for detecting lane-level traffic using connected vehicle data without lane identification information. As vehicles drive along a multi-lane road, traffic jams may occur in different lanes of the road. In some cases, a traffic jam may occur in one lane but not another lane, which is referred to herein as lane-level traffic. In particular, as used herein, lane-level traffic indicates a situation where the average speed of vehicles in one lane of a road is substantially different from the average speed of vehicles in another lane of the road. More specifically, lane-level traffic may indicate a situation in which the average speed of vehicles in one lane of a road in a particular region varies by more than a threshold amount from the average speed of vehicles in another lane of the road within the particular region.

When lane-level traffic occurs, it may lead to inefficient or dangerous driving conditions. As such, it may be desirable to detect lane-level traffic. If lane-level traffic can be detected, drivers and autonomous vehicles may be warned about the lane-level traffic. As such, these drivers or autonomous vehicles may plan a navigation route in consideration of the lane-level traffic. For example, a driver may avoid an area that has lane-level traffic or may change lanes before reaching the lane-level traffic.

Many modern vehicles are connected vehicles, meaning they are able to transmit and/or receive data to or from external computing devices (e.g., other vehicles, traffic infrastructure, edge servers, or a cloud server). As such, if a cloud server or other computing device receives driving data from a number of connected vehicles, the cloud server may use the received driving data to determine traffic information based on the aggregated driving data. However, while many vehicles are able to receive GPS data indicating their positions, GPS data is often noisy and not accurate enough to determine in which lane of a road a vehicle is located. As such, determining lane-level traffic directly from GPS data may not be possible.

In embodiments disclosed herein, a cloud server may detect lane-level traffic using connected vehicle data that does not include lane identification information. In embodiments, the cloud server may receive driving data from connected vehicles within a sampling region. The driving data may include positions, speeds, and lane change activity of the connected vehicles. However, the driving data does not include an indication of which lane a connected vehicle is in.

After receiving the driving data from a plurality of connected vehicles within the sampling region, the cloud server may perform cluster analysis on the speeds of the connected vehicles. If a single cluster is identified, meaning that all the vehicles is in the sampling region are traveling at about the same speed, this indicates that there is no lane-level traffic. However, if multiple clusters are identified, indicating that some vehicles in the sampling region are driving faster than other vehicles, this may indicate that lane-level traffic is present. That is, the multiple clusters may indicate that faster vehicles are driving in one lane, while slower vehicles are driving in another lane. The cloud server may then perform additional techniques, as disclosed in further detail below, to confirm the presence of lane-level traffic.

Figure 1:
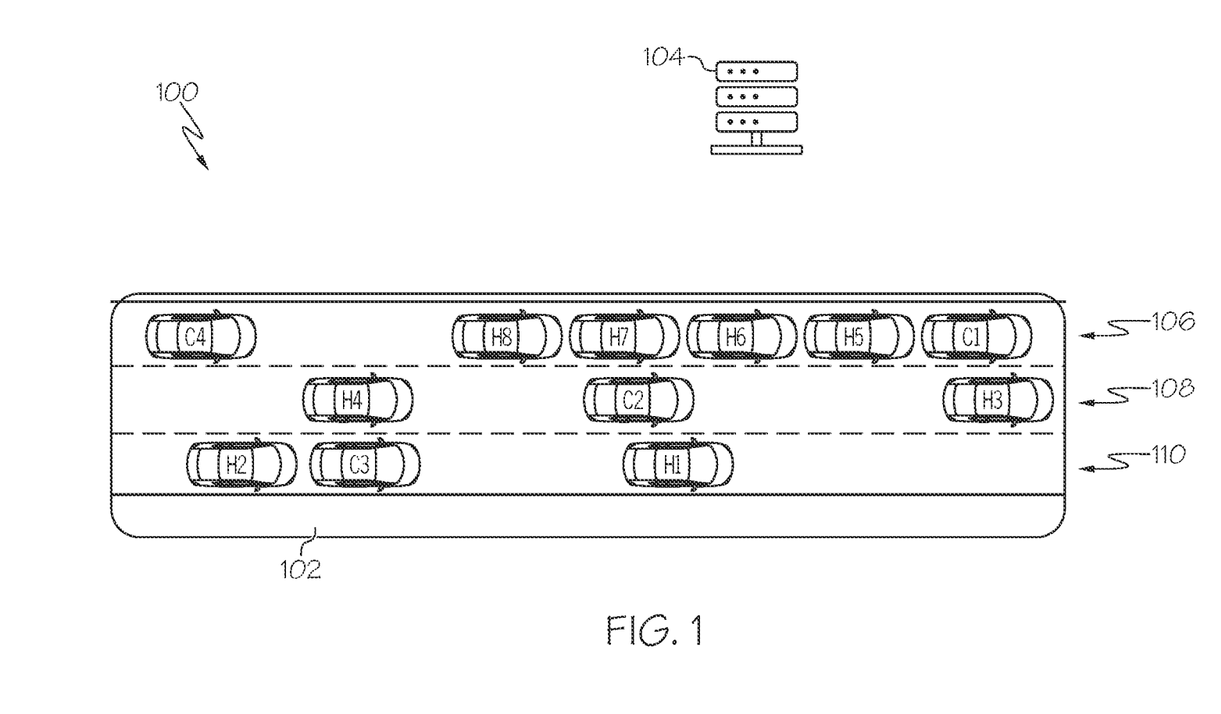
FIG. 1 schematically depicts a system for detecting lane-level traffic using connected vehicle data without lane identification information, according to one or more embodiments shown and described herein.

Turning now to the figures, FIG. 1 schematically depicts a system for detecting lane-level traffic, as disclosed herein. In the example of FIG. 1, a system 100 includes a plurality of vehicles traveling along a road 102 and a cloud server 104.

In the example of FIG. 1, the road 102 includes three lanes 106, 108, and 110 along which a plurality of vehicles are driving, including some connected vehicles and some non-connected vehicles. In the example of FIG. 1, connected vehicles C1 and C4, and non-connected vehicles H5, H6, H7, and H8 are driving in lane 106; connected vehicle C2 and non-connected vehicles H3 and H4 are driving in lane 108; and connected vehicle C3 and non-connected vehicles H1 and H2 are driving in lane 110.

As shown in FIG. 1, lane-level traffic is present in lane 106. That is, vehicles C1, H5, H6, H7, and H8 form a vehicle queue in lane 106, while there are no vehicle queues in lanes 108 or 110. Accordingly, the system 100 may detect the presence of such lane-level traffic using the techniques described herein.

In the example of FIG. 1, the connected vehicles C1-C4 may transmit driving data to the cloud server 104. That is, the connected vehicles C1-C4 may gather data about their driving behavior using one or more sensors (e.g., position, speed, and lane-change activity), and may periodically transmit this data to the cloud server 104 (e.g., every second). In some examples, the connected vehicles C1-C4 may transmit other vehicle data to the cloud server 104 (e.g., wheel angle data).

In the illustrated example, each connected vehicle only transmits data about its own driving behavior to the cloud server 104. However, in other examples, one or more of the connected vehicles C1-C4 may use external sensors to collect driving data about other vehicles (e.g., one or more of the non-connected vehicles H1-H8). For example, connected vehicle C3 may use a LiDAR sensor to collect driving data about nearby non-connected vehicles H2 and H4. In these examples, connected vehicles that gather driving data about other vehicles may transmit this data to the cloud server 104 as well. This may provide more data for the cloud server 104 to use when detecting lane-level traffic.

The connected vehicles C1-C4 may also receive data from the cloud server 104. For example, the connected vehicles C1-C4 may receive traffic data from the cloud server 104, including information about lane-level traffic determined by the cloud server 104. As such, a human driver of a connected vehicle may use the received information to adjust their driving behavior.

In addition, one or more of the connected vehicles C1-C4 may be an autonomous or semi-autonomous vehicle. That is, one or more of the connected vehicles C1-C4 may autonomously perform some or all driving tasks without intervention by a human driver. As such, a connected vehicle that is autonomous may receive information about lane-level traffic from the cloud server 104 and a vehicle system may control the vehicle to autonomously adjust the driving behavior of the vehicle, as disclosed in further detail below.

In the example of FIG. 1, the cloud server 104 may receive data from the connected vehicles C1-C4, as discussed above. The connected vehicles C1-C4 may be communicatively coupled to the cloud server 104 such that the connected vehicles C1-C4 and the cloud server 104 may transmit data between each other. In some examples, the cloud server 104 may be replaced with an edge server or another computing device.

Figure 2:
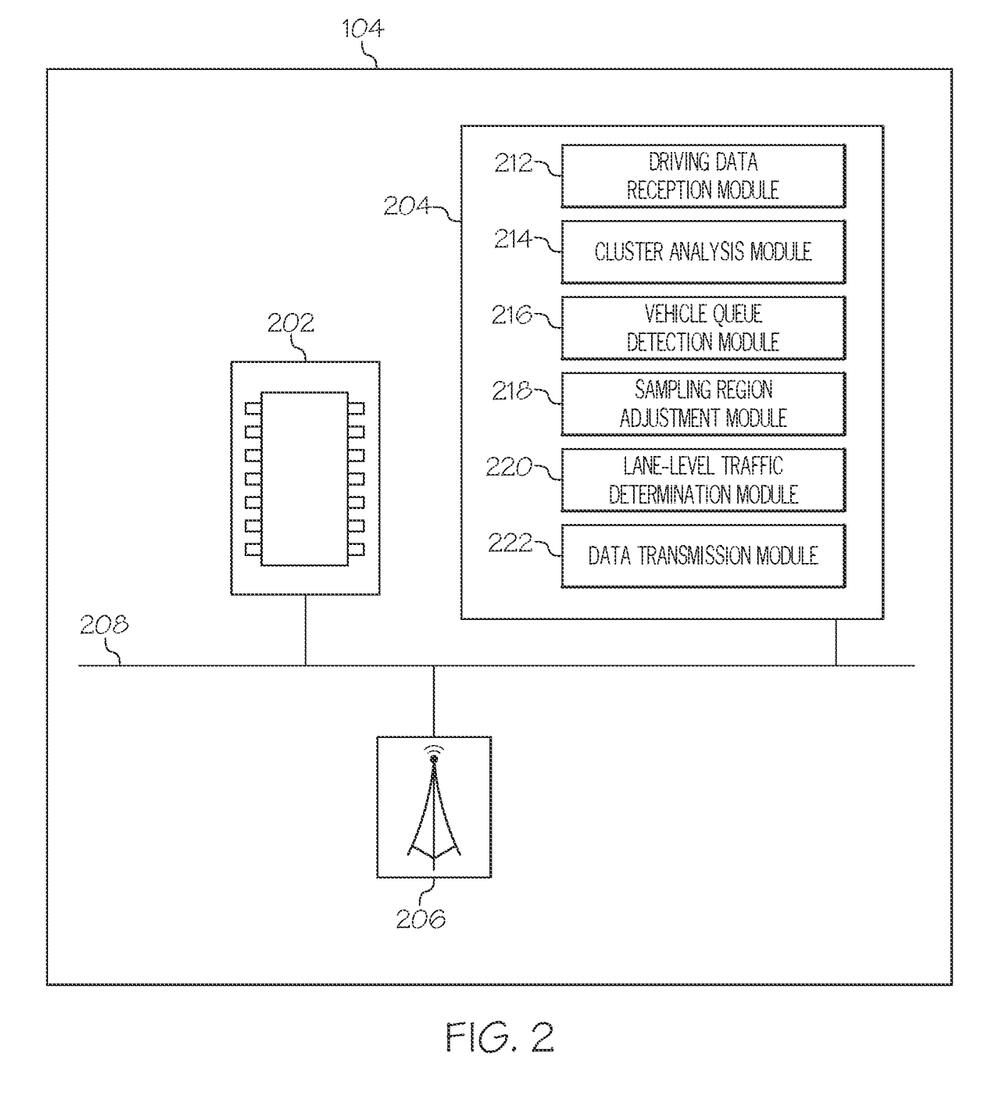
FIG. 2 schematically depicts the cloud server of FIG. 1, according to one or more embodiments shown and described herein.

Now referring to FIG. 2, the cloud server 104 comprises one or more processors 202, one or more memory modules 204, network interface hardware 206, and a communication path 208. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202.

The network interface hardware 206 can be communicatively coupled to the communication path 208 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. The network interface hardware 206 of the cloud server 104 may transmit and receive data to and from the connected vehicles of FIG. 1.

The one or more memory modules 204 include a driving data reception module 212, a cluster analysis module 214, a vehicle queue detection module 216, a sampling region adjustment module 218, a lane-level traffic determination module 220, and a data transmission module 222. Each of the driving data reception module 212, the cluster analysis module 214, the vehicle queue detection module 216, the sampling region adjustment module 218, the lane-level traffic determination module 220, and the data transmission module 222 may be a program module in the form of operating systems, application program modules, and other program modules stored in the one or more memory modules 204. Such a program module may include, but is not limited to, routines, subroutines, programs, objects, components, data structures and the like for performing specific tasks or executing specific data types as will be described below.

The driving data reception module 212 may receive driving data from a plurality of vehicles within a sampling region. The sampling region may be a portion of a road. In some examples, the sampling region may comprise a fixed distance (e.g., 1000 feet). In other examples, the sampling region may vary based on the location of connected vehicles along a road. In the example of FIG. 1, the driving data reception module 212 may receive driving data from the connected vehicles C1, C2, C3, and C4.

The driving data received by the driving data reception module 212 may include speeds, positions, driving directions, and lane change activity of the plurality of vehicles. For example, each connected vehicle within the sampling region may transmit data about itself to the cloud server 104, which may be received by the driving data reception module 212. A speed of a connected vehicle received by the driving data reception module 212 may include a current speed of the connected vehicle (e.g., as measured by a vehicle speedometer). In some examples, the driving data reception module 212 may directly receive speed data from connected vehicles. In other examples, the driving data reception module 212 may receive other vehicle data (e.g., GPS data) and may determine vehicle speed based on the received data.

A position of a connected vehicle received by the driving data reception module 212 may include a current position of the connected vehicle (e.g., as measured by a GPS receiver in the vehicle). Lane change activity of a connected vehicle received by the driving data reception module 212 may include an indication of a time and/or a position at which the vehicle performed a lane change. In some examples, the driving data reception module 212 may receive wheel angle data from a connected vehicle, and the cloud server 104 may determine whether the connected vehicle is performing a lane change based on the wheel angle data (e.g., whether the wheel angle exceeds a predetermined threshold).

Referring still to FIG. 2, the cluster analysis module 214 may perform cluster analysis on the speeds of the plurality of vehicles received by the driving data reception module 212, as disclosed herein. If there is no lane-level traffic within the sampling region, then the speed of traffic in each lane is expected to be about the same. However, if there is lane-level traffic, meaning that there is a traffic jam in one lane, then the speed of traffic in the lane with lane-level traffic is expected to be slower than the speed of traffic in other lanes of the road. As such, cluster analysis may be performed on the speeds of the vehicles within the sample region to determine whether there is a single cluster of speeds (indicating that all vehicles are traveling at roughly the same speed and there is no lane-level traffic), or whether there are multiple clusters of speeds (indicating that one set of vehicles in the sampling region is traveling faster than another set of vehicles, which may indicate the presence of lane-level traffic).

In embodiments, the cluster analysis module 214 may perform cluster analysis of all vehicle speeds received from the sampling region within a given time period (e.g., within 10 minutes). A variety of different clustering algorithms may be used to cluster the speed data (e.g., density-based clustering, distribution-based clustering, and the like). The cluster analysis performed by the cluster analysis module 214 may identify one or more clusters of speeds based on the similarity between the received speeds. The cluster analysis module 214 may then determine whether the vehicle speeds received by the driving data reception module 212 comprise more than one cluster based on the cluster analysis.

In some examples, the cluster analysis module 214 may determine a speed distribution of the vehicle speeds received by the driving data reception module 212 using a Gaussian Mixture model. The cluster analysis module 214 may then determine whether the vehicle speeds comprise more than one cluster based on whether the speed distribution defined by the Gaussian Mixture model comprises more than one mode.

Referring still to FIG. 2, the vehicle queue detection module 216 may determine the location of a vehicle queue, as disclosed herein. As discussed above, when it is determined that there are multiple clusters of vehicle speeds within the sampling region, there may be lane-level traffic within the sampling region. As such, the vehicle queue detection module 216 may determine where the vehicle queue is, within the sampling region.

Figure 3:
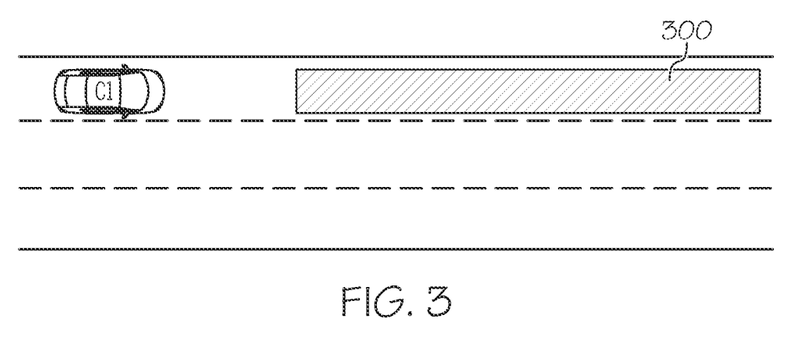
FIG. 3 depicts an example vehicle approaching a traffic jam, according to one or more embodiments shown and described herein.
Figure 4:
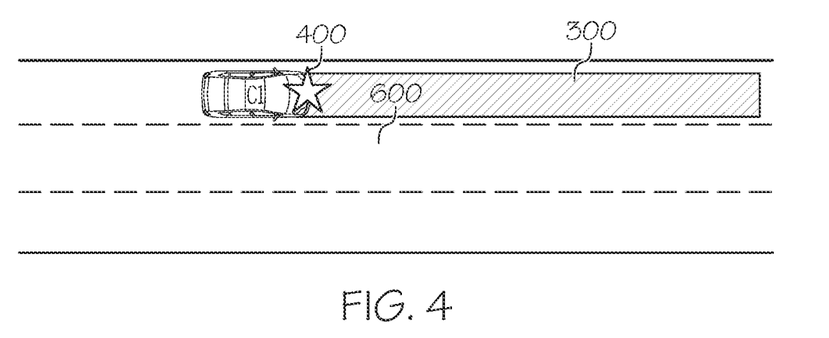
FIG. 4 depicts an example vehicle reaching the rear of a traffic jam, according to one or more embodiments shown and described herein.

In embodiments, the vehicle queue detection module 216 may identify one or more back of queue samples and one or more front of queue samples, as disclosed herein. FIG. 3 shows an example in which a vehicle C1 approaches a traffic jam 300 located in one lane of a road. As used herein, a traffic jam and a vehicle queue may be used interchangeably. The vehicles in the traffic jam travel slower than other vehicles not in the traffic jam. As such, as the vehicle C1 approaches the traffic jam 300, the vehicle C1 will be traveling at a higher rate of speed than the vehicles in the traffic jam. Accordingly, when the vehicle C1 reaches the back of the traffic jam 300, the vehicle C1 must reduce its speed to match the speed of the vehicles in the traffic jam. Accordingly, the location where the speed of the vehicle C1 is so reduced may be identified as a back of queue sample. As used herein, a back of queue sample is a data point indicating the location of a back or rear portion of a vehicle queue. FIG. 4 shows a point 400 that may correspond to a back of queue sample.

In embodiments, the vehicle queue detection module 216 may identify a back of queue sample as a location where a vehicle speed decreases below a threshold value. In some examples, the threshold may be a fixed value (e.g., 30 MPH). In some examples, the threshold may be a value relative to a speed limit of the road on which the vehicle is traveling (e.g., 70% of the speed limit). In some examples, the threshold may be a value relative to the average speed of vehicles traveling along the road, based on the driving data received by the driving data reception module 212 (e.g., 60% of the average vehicle speed).

In some examples, the vehicle queue detection module 216 may identify a back of queue sample as a location where a vehicle speed decreases from above a first threshold (e.g., 60 MPH) to below a second threshold (e.g., 40 MPH) within a threshold amount of time (e.g., 10 seconds). This may show that the vehicle speed has decreased significantly in a short period of time, which may indicate that the vehicle has reached the back of a traffic jam and must slow down accordingly. In some examples, the vehicle queue detection module 216 may identify a back of queue sample as a location where a vehicle speed decreases by more than a threshold amount (e.g., 15 MPH) or by more than a threshold percentage (e.g., 20%), within a threshold amount of time.

Figure 5:
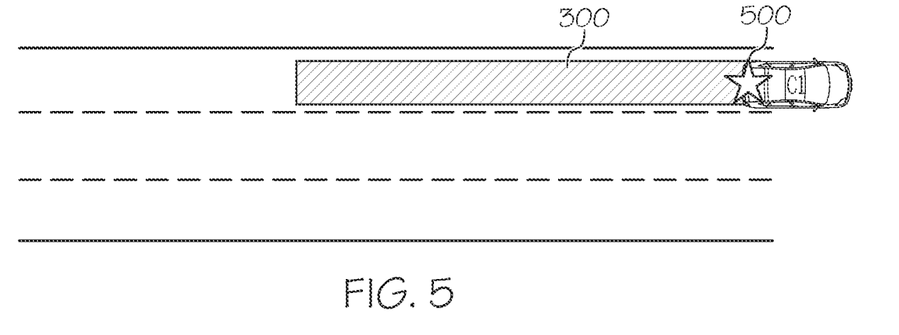
FIG. 5 depicts an example vehicle reaching the front of a traffic jam, according to one or more embodiments shown and described herein.

In addition to back of queue samples, the vehicle queue detection module 216 may also identify front of queue samples. FIG. 5 depicts an example in which the vehicle C1 has reached the front of the traffic jam 300. Accordingly, the vehicle C1 may begin to increase its speed, having reached the front of the traffic jam 300. FIG. 5 shows a point 500 that may correspond to a front of queue sample.

In embodiments, the vehicle queue detection module 216 may identify a front of queue sample as a location where a vehicle speed increases above a threshold value. In some examples, the threshold may be a fixed value (e.g., 50 MPH). In some examples, the threshold may be a value relative to a speed limit of the road on which the vehicle is traveling (e.g., 90% of the speed limit). In some examples, the threshold may be a value relative to the average speed of vehicles traveling along the road, based on the driving data received by the driving data reception module 212 (e.g., 80% of the average vehicle speed).

In some examples, the vehicle queue detection module 216 may identify a front of queue sample as a location where a vehicle speed increases from below a first threshold (e.g., 40 MPH) to above a second threshold (e.g., 60 MPH) within a threshold amount of time (e.g., 10 seconds). This may show that the vehicle speed has increased significantly in a short period of time, which may indicate that the vehicle has reached the front of a traffic jam and can now accelerate freely. In some examples, the vehicle queue detection module 216 may identify a front of queue sample as a location where a vehicle speed increases by more than a threshold amount (e.g., 15 MPH) or by more than a threshold percentage (e.g., 20%), within a threshold amount of time.

Figure 6:
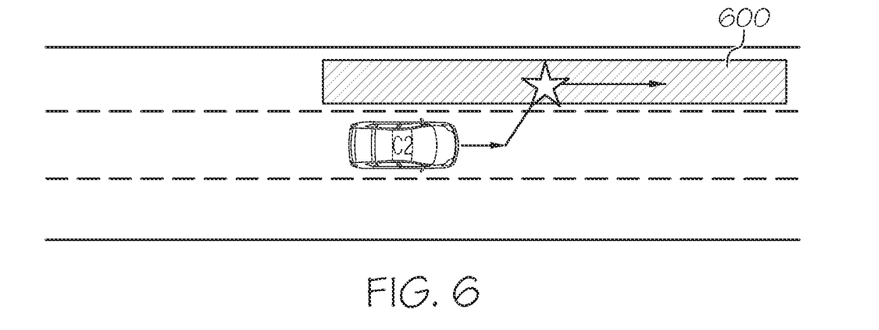
FIG. 6 depicts an example vehicle changing lanes into a traffic jam, according to one or more embodiments shown and described herein.

In addition to identifying locations where a vehicle increases or decreases its speed above or below a threshold, the vehicle queue detection module 216 may also consider lane change activity when identifying front or back of queue samples, as disclosed herein. FIG. 6 shows an example in which vehicle C2 performs a lane change from a lane in which there is not a traffic jam into a lane in which there is a traffic jam 600. As such, the vehicle C2 will have to decelerate after performing the lane change in order to match the speed of the traffic jam. However, because the vehicle C2 is changing lanes into the middle of the traffic jam, the location where the vehicle C2 changes lanes should not be considered a back of queue sample, even if the vehicle decelerates below a threshold value at this position.

Figure 7:
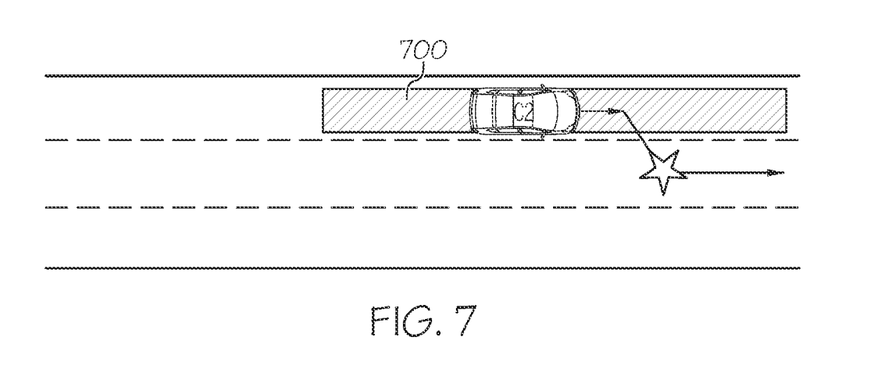
FIG. 7 depicts an example vehicle changing lanes out of a traffic jam, according to one or more embodiments shown and described herein.

Similarly, FIG. 7 shows an example in which vehicle C1 performs a lane change from a lane in which there is a traffic jam 700 into a lane in which there is not a traffic jam. As such, after performing the lane change, the vehicle C1 is able to accelerate since the vehicle is no longer in the traffic jam in the adjacent lane. However, because the vehicle C1 is changing lanes out of the middle of the traffic jam, the location where the vehicle C1 changes lanes should not be considered a front of queue sample, even if the vehicle accelerates above a threshold value at this position.

Therefore, in embodiments, the vehicle queue detection module 216 may identify locations where vehicles in the sampling region perform lane changes based on the driving data received by the driving data reception module 212. The vehicle queue detection module 216 may then exclude those locations from back of queue or front of queue samples. More particularly, the vehicle queue detection module 216 may identify a back of queue sample as a location where a vehicle speed decreases below a threshold value and does not perform a lane change. In addition, the vehicle queue detection module 216 may identify a front of queue sample as a location where a vehicle speed increases above a threshold value and does not perform a lane change.

Figure 8:
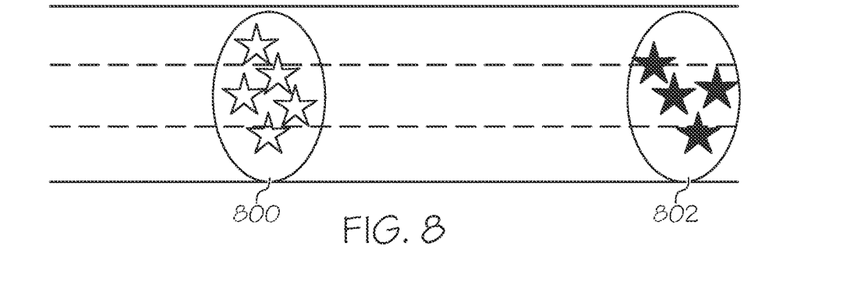
FIG. 8 depicts a plurality of back of queue clusters and front of queue clusters, according to one or more embodiments shown and described herein.

After identifying one or more back of queue samples and one or more front of queue samples, the vehicle queue detection module 216 may identify a rear position of a traffic jam based on a mean position of the identified back of queue samples. The vehicle queue detection module 216 may identify a front position of a traffic jam based on a mean position of the identified front of queue samples. FIG. 8 shows an example in which a plurality of back of queue clusters 800 and a plurality of front of queue clusters 802. As such, the mean position of the back of queue clusters 800 may be identified as a rear position of a traffic jam, and the mean position of the front of queue clusters 802 may be identified as a front position of a traffic jam.

Figure 9:
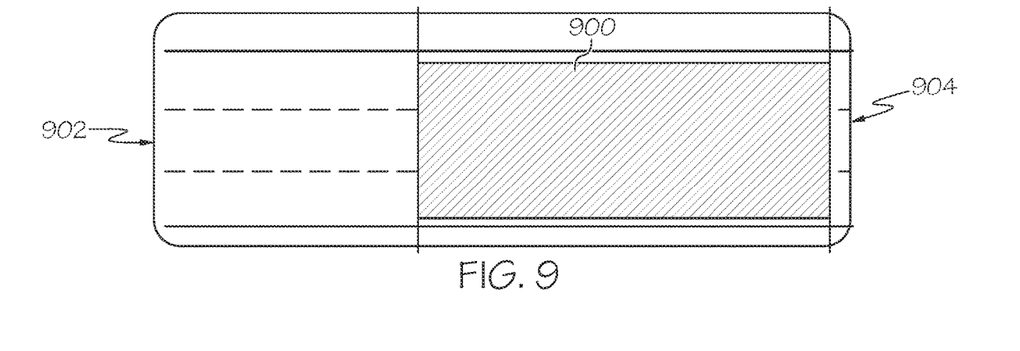
FIG. 9 depicts a traffic jam identified within a sampling region, according to one or more embodiments shown and described herein.

After identifying a rear position of a traffic jam and a front position of a traffic jam, using the techniques described above, the vehicle queue detection module 216 may identify the position of a traffic jam. However, while it is possible that this traffic jam is located in only one lane, which would indicate lane-level traffic, it is also possible that this traffic jam is located in all lanes, which would not indicate lane-level traffic. For example, FIG. 9 illustrates an example situation in which a traffic jam 900 covers all lanes of a road. In the example of FIG. 9, the sampling region spans from position 902 to position 904. As such, as vehicles in the back of the sampling region reach the back of the traffic jam 900, they may decelerate in all lanes, creating back of queue samples. As vehicles reach the front of the traffic jam 900 while still within the sampling region, they may accelerate in all lanes, creating front of queue samples. As such, in order to determine whether the traffic jam 900 is in all lanes of the road or just one lane of the road, an adjusted sampling region may be determined, as disclosed herein.

Figure 10:
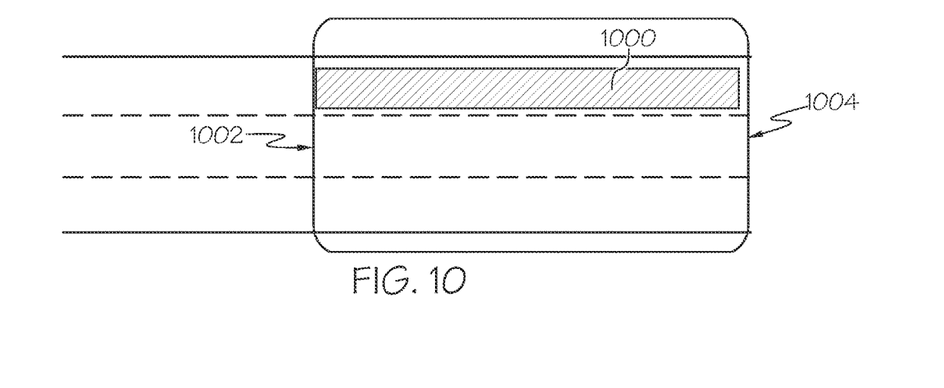
FIG. 10 depicts a traffic jam identified within an adjusted sampling region, according to one or more embodiments shown and described herein.

Referring back to FIG. 2, the sampling region adjustment module 218 may determine an adjusted sampling region spanning from the rear position of the traffic jam determined by the vehicle queue detection module 216 to the front position of the traffic jam determined by the vehicle queue detection module 216. FIG. 10 shows an example traffic jam 1000 that has been identified and an adjusted sampling region spanning from position 1002 (the rear position of the traffic jam) to position 1004 (the front position of the traffic jam).

Once the sampling region adjustment module 218 has determined an adjusted sampling region only spanning the length of an identified traffic jam, the driving data reception module 212 may receive driving data from vehicles in the adjusted sampling region. The cluster analysis module 214 may then perform cluster analysis on the driving data received from the adjusted sampling region and determine whether multiple clusters of speeds are present within the adjusted sampling region.

If the cluster analysis module 214 only identifies a single cluster of vehicle speeds within the adjusted sampling region, this indicates that the multiple vehicle speed clusters identified in the original sampling region comprises one cluster within the adjusted sampling region and one or more clusters outside of the adjusted sampling region, but within the original sampling region. This indicates that there is a section-level traffic jam across all lanes of the road within the adjusted sampling region, and no lane-level traffic. However, if multiple vehicle speed clusters are identified within the adjusted sampling region, then this indicates that there is lane-level traffic within the adjusted sampling region. That is, there is a traffic jam in at least one lane of the road within the adjusted sampling region, but there is also at least one lane of the road within the adjusted sampling region that does not have a traffic jam.

Referring back to FIG. 2, the lane-level traffic determination module 220 determines whether there is lane-level traffic, as disclosed herein. In particular, the lane-level traffic determination module 220 determines that there is lane-level traffic within the adjusted sampling region if multiple clusters of vehicle speeds are identified within the adjusted sampling region.

Referring still to FIG. 2, the data transmission module 222 may transmit information to one or more connected vehicles indicating the presence of lane-level traffic within the adjusted sampling region. In some examples, the data transmission module 222 may transmit this information to all connected vehicles within the adjusted sampling region. In some examples, the data transmission module 222 may transmit this information to all vehicles approaching the adjusted sampling region. In some examples, the data transmission module 222 may transmit this information to all vehicles within a predetermined threshold distance of the adjusted sampling region (e.g., within 1 mile).

The information transmitted by the data transmission module 222 may indicate the location of the identified lane-level traffic. For example, the data transmission module 222 may transmit the location of the rear position of the vehicle queue identified by the vehicle queue detection module 216 and the front position of the vehicle queue identified by the vehicle queue detection module 216.

In some examples, the data transmission module 222 may transmit the location of the identified lane-level traffic to an autonomous vehicle, thereby causing a vehicle system of the autonomous vehicle to control the autonomous vehicle to autonomously navigate around the lane-level traffic. That is, the autonomous vehicle may receive the location of the lane-level traffic (e.g., the rear position of the identified traffic jam and the front position of the identified traffic jam), and autonomously determine a navigation route to avoid the area with the lane-level traffic. A vehicle system of the autonomous vehicle may then control the vehicle to follow the navigation route. This may allow the autonomous vehicle to autonomously avoid the lane-level traffic, which may increase driving efficiency.

Figure 11:
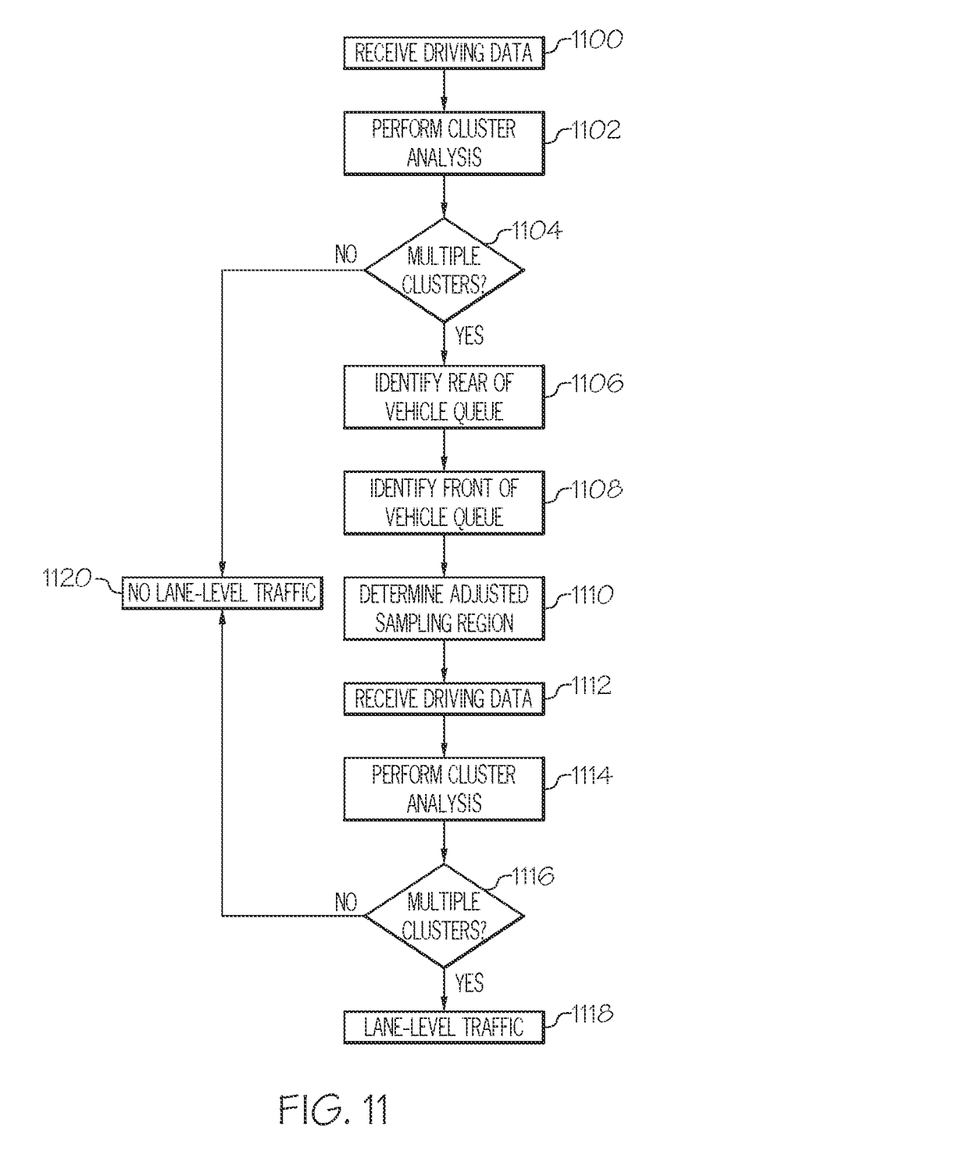
FIG. 11 depicts a flowchart of a method that may be performed by the cloud server of FIGS. 1 and 2, according to one or more embodiments shown and described herein.

FIG. 11 depicts a flowchart of an example method that may be performed by the cloud server 104. At step 1100, the driving data reception module 212 receives driving data from one or more connected vehicles within a sampling region. As disclosed above, the driving data may include positions, speeds, and lane change activity of vehicles within the sampling region.

At step 1102, the cluster analysis module 214 determines vehicle speeds of the plurality of vehicles based on the driving data, and performs cluster analysis of the speeds of the plurality of vehicles. At step 1104, the cluster analysis module 214 determines whether the speeds of the plurality of vehicles in the sampling region comprise more than one cluster based on the cluster analysis. If the cluster analysis module 214 determines that the speeds of the plurality of vehicles comprise a single cluster (No at step 1104), then at step 1120, the lane-level traffic determination module 220 determines that there is no lane-level traffic. Alternatively, if the cluster analysis module 214 determines that the speeds of the plurality of vehicles comprise multiple clusters (Yes at step 1104), then control passes to step 1106.

At step 1106, the vehicle queue detection module 216 identifies a location of a rear position of a traffic jam. In particular, the vehicle queue detection module 216 identifies one or more back of queue samples at each location where a vehicle speed is reduced below a threshold value and the vehicle has not performed a lane change. The vehicle queue detection module 216 then identifies the location of the rear position of the traffic jam as the mean location of all identified back of queue samples.

At step 1108, the vehicle queue detection module 216 identifies a location of a front position of the traffic jam. In particular, the vehicle queue detection module 216 identifies one or more front of queue samples at each location where a vehicle speed is increased above a threshold value and the vehicle has not performed a lane change. The vehicle queue detection module 216 then identifies the location of the front position of the traffic jam as the mean location of all identified front of queue samples.

At step 1110, the sampling region adjustment module 218 determines an adjusted sampling region spanning from the identified rear position of the traffic jam to the identified front position of the traffic jam. At step 1112, the driving data reception module 212 receives driving data from connected vehicles within the adjusted sampling region.

At step 1114, the cluster analysis module 214 performs cluster analysis based on the speeds of vehicles within the adjusted sampling region. At step 1116, the cluster analysis module 214 determines whether there are multiple clusters of vehicle speeds within the adjusted sampling region. If there are not multiple clusters of vehicle speeds within the adjusted sampling region (No at step 1116), then at step 1120, the lane-level traffic determination module 220 determines that there is no lane-level traffic. If there are multiple clusters of vehicle speeds within the adjusted sampling region (Yes at step 1116), then the lane-level traffic determination module 220 determines that there is lane-level traffic within the adjusted sampling region. In some examples, the data transmission module 222 transmits the location of the lane-level traffic (e.g., the rear position and front position of the adjusted sampling region) to one or more connected vehicles.

It should now be understood that embodiments described herein are directed to detecting lane-level traffic using connected vehicle data without lane identification information. By utilizing the techniques disclosed herein, lane-level traffic may be identified by receiving vehicle data from connected vehicles that does not include lane identification information. As such, lane-level traffic may be identified even when lane identification information is unavailable. Locations of lane-level traffic may be transmitted to connected vehicles, which may then be navigated, either autonomously or by a human driver, with the knowledge of the lane-level traffic. This may improve overall traffic flow.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving driving data from a plurality of vehicles within a sampling region, the driving data including speeds, positions, and lane change activity of the plurality of vehicles;
   determining speeds of the plurality of vehicles based on the driving data;
   performing cluster analysis on the speeds of the plurality of vehicles;
   determining whether the speeds of the plurality of vehicles comprise more than one cluster based on the cluster analysis; and
   upon determination that the speeds of the plurality of vehicles comprise more than one cluster, determining that lane-level traffic is present within the sampling region.

2. The method of claim 1, further comprising, upon determination that the speeds of the plurality of vehicles comprise more than one cluster:
   identifying first locations where one or more of the plurality of vehicles performs a lane change based on the driving data;
   identifying second locations where the speeds of one or more of the plurality of vehicles decreases below a first predetermined threshold;
   identifying third locations where the speeds of one or more of the plurality of vehicles increases above a second predetermined threshold; and
   identifying a location of a traffic jam based on the first locations, the second locations, and the third locations.

3. The method of claim 2, further comprising:
   identifying one or more back of queue samples at each of the second locations that do not match any of the first locations;
   identifying one or more front of queue samples at each of the third locations that do not match any of the first locations; and
   identifying the location of the traffic jam based on the one or more back of queue samples and the one or more front of queue samples.

4. The method of claim 3, further comprising:
   determining a location of a rear position of the traffic jam based on a mean of the one or more back of queue samples; and
   determining a location of a front position of the traffic jam based on a mean of the one or more front of queue samples.

5. The method of claim 3, further comprising:
   determining a second sampling region based on the one or more back of queue samples and the one or more front of queue samples;
   determining second speeds of one or more of the plurality of vehicles located within the second sampling region based on the driving data;
   performing second cluster analysis on the second speeds;
   determining whether the second speeds comprise more than one cluster based on the second cluster analysis; and
   upon determination that the second speeds comprise more than one cluster, determining that lane-level traffic is present within the second sampling region.

6. The method of claim 5, further comprising:
   determining a rear position of the second sampling region based on a mean of the one or more back of queue samples; and
   determining a front position of the second sampling region based on a mean of the one or more front of queue samples.

7. The method of claim 1, further comprising:
   determining a speed distribution of the plurality of vehicles using a Gaussian Mixture model; and
   determining whether the speeds of the plurality of vehicles comprise more than one cluster based on whether the speed distribution comprises more than one mode.

8. The method of claim 1, further comprising:
   receiving wheel angle data associated with the plurality of vehicles; and
   determining the lane change activity of the plurality of vehicles based on the wheel angle data.

9. The method of claim 1, further comprising:
   upon determination that lane-level traffic is present within the sampling region, transmitting a location of the sampling region and an indication of the presence of the lane-level traffic to an autonomous vehicle, thereby causing a vehicle system to control the autonomous vehicle to navigate around the sampling region.

10. A computing device comprising one or more processors configured to:
    receive driving data from a plurality of vehicles within a sampling region, the driving data including speeds, positions, and lane change activity of the plurality of vehicles;
    determine speeds of the plurality of vehicles based on the driving data;
    perform cluster analysis on the speeds of the plurality of vehicles;
    determine whether the speeds of the plurality of vehicles comprise more than one cluster based on the cluster analysis; and
    upon determination that the speeds of the plurality of vehicles comprise more than one cluster, determine that lane-level traffic is present within the sampling region.

11. The computing device of claim 10, wherein the one or more processors are further configured to, upon determination that the speeds of the plurality of vehicles comprise more than one cluster:
    identify first locations where one or more of the plurality of vehicles performs a lane change based on the driving data;
    identify second locations where the speeds of one or more of the plurality of vehicles decreases below a first predetermined threshold;
    identify third locations where the speeds of one or more of the plurality of vehicles increases above a second predetermined threshold; and
    identify a location of a traffic jam based on the first locations, the second locations, and the third locations.

12. The computing device of claim 11, wherein the one or more processors are further configured to:
    identify one or more back of queue samples at each of the second locations that do not match any of the first locations;

identify one or more front of queue samples at each of the third locations that do not match any of the first locations; and identify the location of the traffic jam based on the one or more back of queue samples and the one or more front of queue samples.

13. The computing device of claim 12, wherein the one or more processors are further configured to:

determine a location of a rear position of the traffic jam based on a mean of the one or more back of queue samples; and determine a location of a front position of the traffic jam based on a mean of the one or more front of queue samples.

14. The computing device of claim 12, wherein the one or more processors are further configured to:

determine a second sampling region based on the one or more back of queue samples and the one or more front of queue samples;

determine second speeds of one or more of the plurality of vehicles located within the second sampling region based on the driving data;

perform second cluster analysis on the second speeds;

determine whether the second speeds comprise more than one cluster based on the second cluster analysis; and upon determination that the second speeds comprise more than one cluster, determine that lane-level traffic is present within the second sampling region.

15. The computing device of claim 14, wherein the one or more processors are further configured to:

determine a rear position of the second sampling region based on a mean of the one or more back of queue samples; and determine a front position of the second sampling region based on a mean of the one or more front of queue samples.

16. The computing device of claim 10, wherein the one or more processors are further configured to:

determine a speed distribution of the plurality of vehicles using a Gaussian Mixture model; and determine whether the speeds of the plurality of vehicles comprise more than one cluster based on whether the speed distribution comprises more than one mode.

17. The computing device of claim 10, wherein the one or more processors are further configured to:

receive wheel angle data associated with the plurality of vehicles; and determine the lane change activity of the plurality of vehicles based on the wheel angle data.

18. The computing device of claim 10, wherein the one or more processors are further configured to:

upon determination that lane-level traffic is present within the sampling region, transmit a location of the sampling region and an indication of the presence of the lane-level traffic to an autonomous vehicle, thereby causing a vehicle system to control the autonomous vehicle to navigate around the sampling region.

19. A system comprising a computing device and a plurality of vehicles, wherein:

the plurality of vehicles are configured to transmit driving data to the computing device, the driving data including speeds, positions, and lane change activity of the plurality of vehicles; and the computing device comprises one or more processors configured to:

determine speeds of the plurality of vehicles based on the driving data;

perform cluster analysis on the speeds of the plurality of vehicles;

determine whether the speeds of the plurality of vehicles comprise more than one cluster based on the cluster analysis; and upon determination that the speeds of the plurality of vehicles comprise more than one cluster, determine that lane-level traffic is present within the sampling region.

20. The system of claim 19, wherein the one or more processors are configured to:

identify first locations where one or more of the plurality of vehicles performs a lane change based on the driving data;

identify second locations where the speeds of one or more of the plurality of vehicles decreases below a first predetermined threshold;

identify third locations where the speeds of one or more of the plurality of vehicles increases above a second predetermined threshold; and identify a location of a traffic jam based on the first locations, the second locations, and the third locations.

* * * * *